United States Patent
Bhaskaran

(10) Patent No.: US 12,477,452 B2
(45) Date of Patent: Nov. 18, 2025

(54) METHOD FOR SLICE SPECIFIC OVERLOAD CONTROL IN A RADIO ACCESS NETWORK

(71) Applicant: Rakuten Symphony, Inc., Tokyo (JP)

(72) Inventor: Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/025,417

(22) PCT Filed: Nov. 22, 2022

(86) PCT No.: PCT/US2022/050782
§ 371 (c)(1),
(2) Date: Mar. 9, 2023

(87) PCT Pub. No.: WO2024/112331
PCT Pub. Date: May 30, 2024

(65) Prior Publication Data
US 2024/0357479 A1    Oct. 24, 2024

(51) Int. Cl.
*H04W 48/18* (2009.01)
*H04W 24/02* (2009.01)
*H04W 76/10* (2018.01)
*H04W 92/24* (2009.01)

(52) U.S. Cl.
CPC ........... *H04W 48/18* (2013.01); *H04W 24/02* (2013.01); *H04W 76/10* (2018.02); *H04W 92/24* (2013.01)

(58) Field of Classification Search
CPC ..... H04W 48/18; H04W 76/10; H04W 24/02; H04W 92/24
See application file for complete search history.

(56) References Cited

U.S. PATENT DOCUMENTS

| | | | |
|---|---|---|---|
| 2019/0174536 A1* | 6/2019 | Han | H04W 74/0833 |
| 2019/0357119 A1 | 11/2019 | Hong et al. | |
| 2022/0095159 A1* | 3/2022 | Patil | H04W 48/02 |
| 2022/0124560 A1 | 4/2022 | Yeh et al. | |
| 2023/0308949 A1* | 9/2023 | Centonza | H04W 28/0942 |
| 2023/0345359 A1* | 10/2023 | Yang | H04W 52/0206 |
| 2024/0179736 A1* | 5/2024 | Park | H04W 72/04 |
| 2025/0039694 A1* | 1/2025 | Kolan | H04L 41/0893 |

FOREIGN PATENT DOCUMENTS

| | | | | |
|---|---|---|---|---|
| WO | WO-2020033174 A1 * | 2/2020 | | H04W 28/02 |
| WO | 2021/119627 A1 | 6/2021 | | |

* cited by examiner

Primary Examiner — Brian J. Gillis
(74) Attorney, Agent, or Firm — Sughrue Mion, PLLC

(57) ABSTRACT

A method of performing slice specific overload control in a wireless communication system, including detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI); mapping slices to access categories in the RAN; and informing the RAN of actions to take to mitigate the detected slice specific overload.

20 Claims, 4 Drawing Sheets

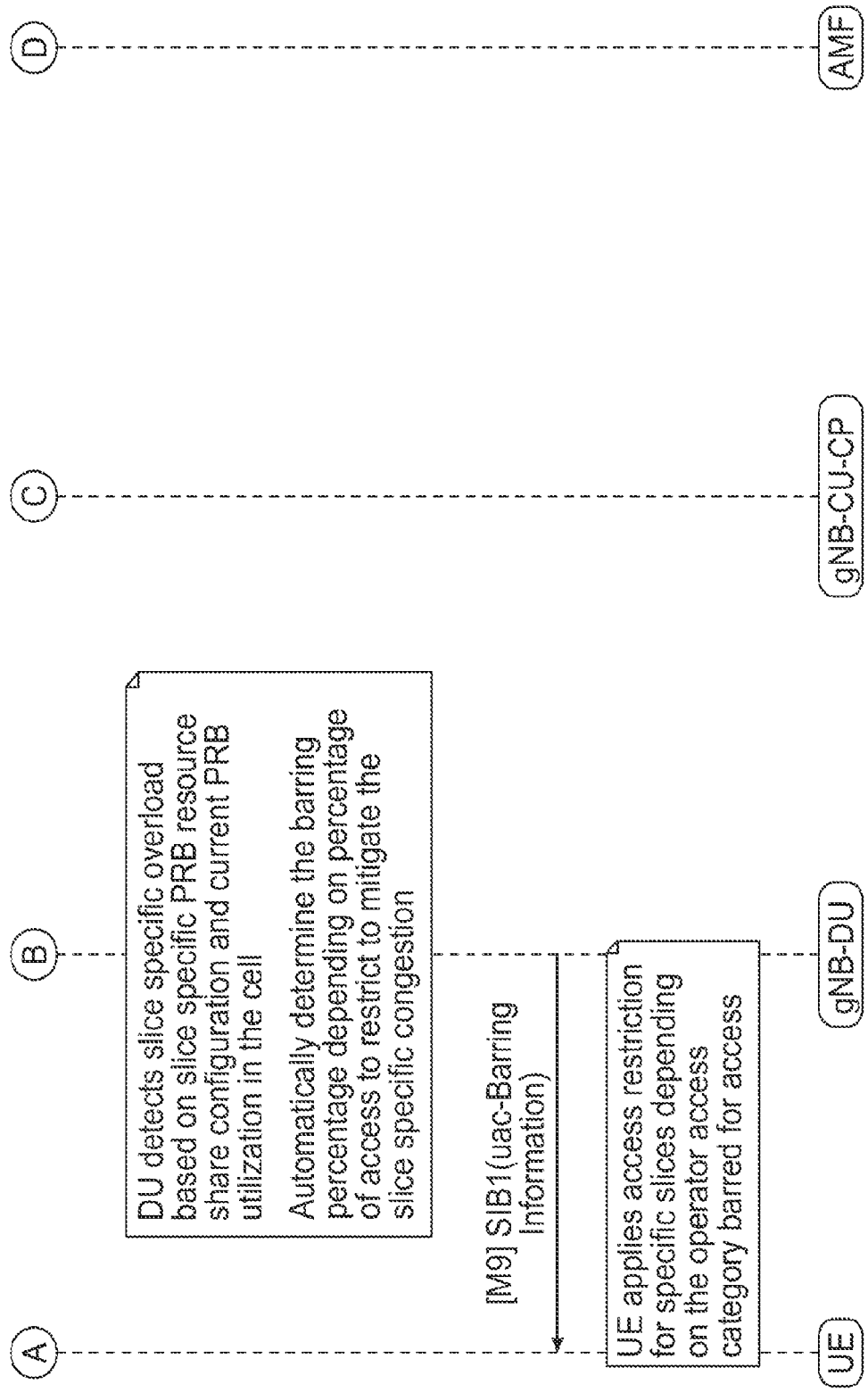

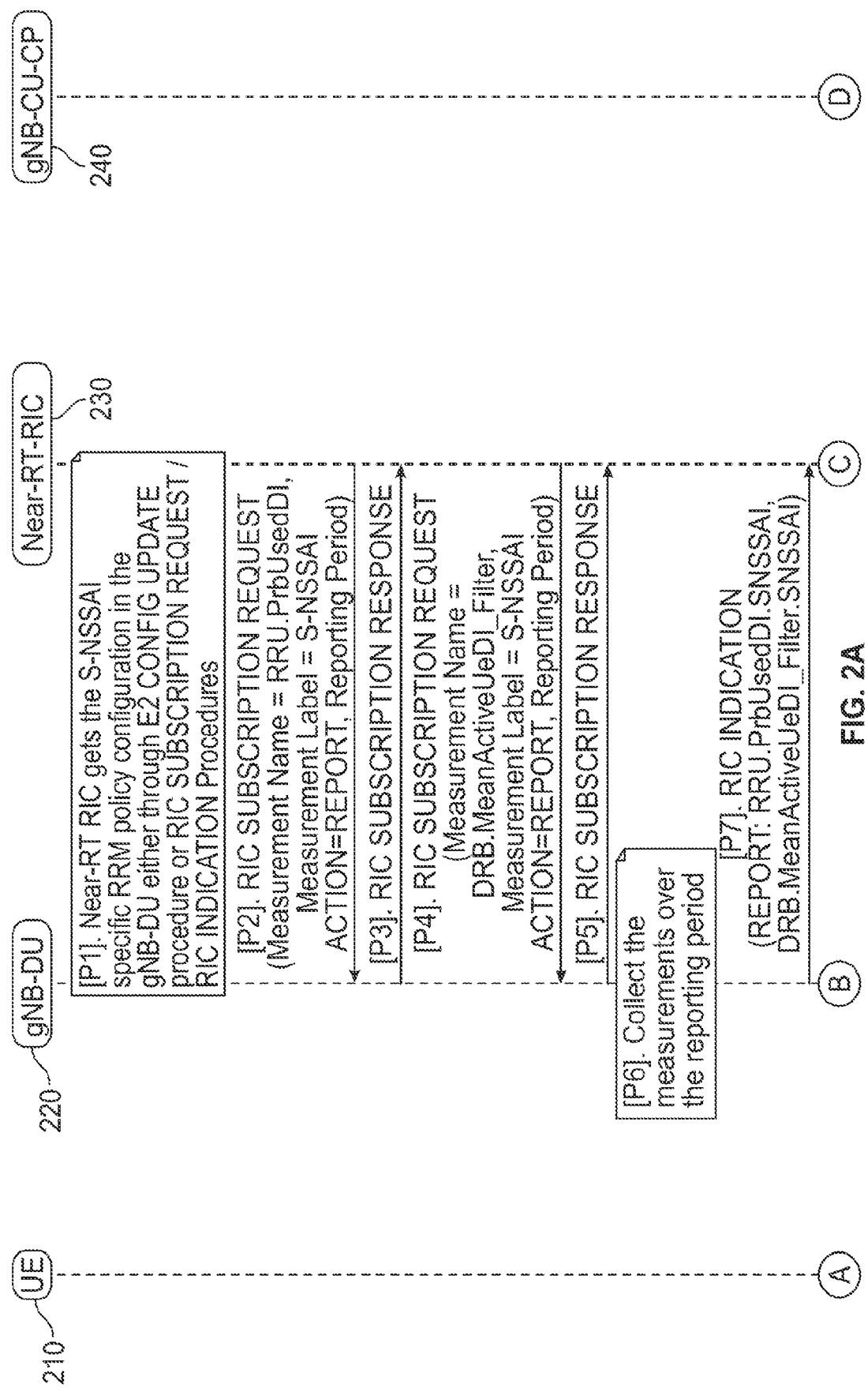

METHOD FOR SLICE SPECIFIC OVERLOAD CONTROL IN A RADIO ACCESS NETWORK

CROSS-REFERENCE TO RELATED APPLICATION

This application is a national stage application of International Application No. PCT/US2022/050782, filed on Nov. 22, 2022, and designated the U.S., the entire contents of which are herein wholly incorporated by reference.

TECHNICAL FIELD

In some example embodiments, the subject matter herein generally relates to overload control in wireless communication systems, and more specifically to slice specific overload control in Radio Access Network (RAN) communication systems.

BACKGROUND

Under high network load conditions, the network may protect itself against overload by using the Unified Access Control (UAC) functionality for 3GPP access to limit access attempts from the user equipment (UE). The unified access control supports extensibility to allow inclusion of additional standardized access identities and access categories, and supports flexibility to allow operators to define operator-defined access categories using their own criterion. One such criterion is network slicing, which is considered an important feature by 3GPP. Identification of a network slice is done via the Single Network Slice Selection Assistance Information (S-NSSAI). Network Slice Selection Assistance Information (NSSAI) contains multiple S-NSSAI. A UE can be configured to access multiple slices, and each slice may serve a particular service type with agreed upon service level agreement (SLA) with the service provider. The operator-defined access category definitions can be signaled to the UE using non-access stratum (NAS) signaling with access category criteria type set to S-NSSAI.

3GPP currently specifies signaling of overload from the core network to the radio access network, indicating the set of slices that are overloaded. However, how the radio access network (RAN) is supposed to handle the overload condition, and how the radio access network maps the slice specific overload to access categories in the Unified Access Control (UAC) framework are not specified.

Therefore, there is a need for slice specific overload control in a RAN which provides the capability to detect a slice specific overload "instance" in RAN and mitigate any slice specific congestion by initiating access class barring through 3GPP specific UAC framework. Also, there is a need for mapping slices to access categories in the RAN.

SUMMARY

In one general aspect, a method of performing slice specific overload control in a wireless communication system is provided. The method includes detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI); mapping slices to access categories in the RAN; and informing the RAN of actions to take to mitigate the detected slice specific overload.

In another general aspect, a wireless communication system is provided. The wireless communication system includes a core network; a Radio Access Network (RAN), the RAN including: a plurality of User Equipment; and a plurality of base stations (gNB), each of the plurality of gNB including with at least one Centralized Unit (CU) and one Distributed Unit (DU), wherein a gNB-CU Control Plane (gNB-CU-CP) is configured to trigger a specific action to mitigate a detected slice specific overload; an Access Mobility Function (AMF); and a Near-Real-Time RAN Intelligent Controller (Near-RT RIC), wherein at least one gNB-DU or the Near-RT RIC is configured to detect a slice overload in the RAN based on a Physical Resource Block (PRB) utilization threshold and a predetermined period of time, wherein a particular RAN network slice is identified via Network Slice Selection Assistance Information (S-NSSAI), wherein mapping slices to operator specific categories is performed by one of the AMF or Near-RT RIC, the AMF or Near-RT RIC sending the mapping information to the gNB-CU-CP, and wherein the RAN is configured to take the specific action to mitigate the detected slice specific overload.

In another general aspect, a non-transitory computer-readable medium having stored thereon instructions for causing processing circuitry to execute a process is provided. The process includes detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI); mapping slices to access categories in the RAN; and informing the RAN of actions to take to mitigate the detected slice specific overload.

DETAILED DESCRIPTION

As discussed above, while standards specify how to map a slice identifier S-NSSAI to an access category through NAS signaling (which is between the UE and the core network), there is no provision for the RAN to obtain such mapping. Furthermore, standards do not specify how slice specific congestion situation can be detected in RAN or how UAC can be autonomously initiated by RAN to mitigate this situation. Embodiments of the present disclosure provide methods and systems for detecting a slice specific overload in radio access networks, mitigation the slice specific congestion by initiating access class barring through 3GPP specific Unified Access Control (UAC) framework, and mapping slices to access categories in the radio access network.

In the RAN, the share of radio resources (Physical Resource Block) to be used for a particular network slice (identified by S-NSSAI) can be configured using the RRM policy ratios specified in 3GPP TS 28.541 section 4.3.36.

Using this the maximum PRB resource available for each slice in each cell is known. When the PRB utilization nears—say 90 to 95% threshold of the maximum available resources for a slice and if that utilization is sustained over a period of time (say 15 minutes), then identify that the cell is undergoing a consistent overload situation for a particular slice. Such overload condition can be detected directly in the DU, or an xApp in the near-RT RIC through real time streaming of cell specific, S-NSSAI specific PRB utilization to the Near-RT RIC.

Figure 1A:
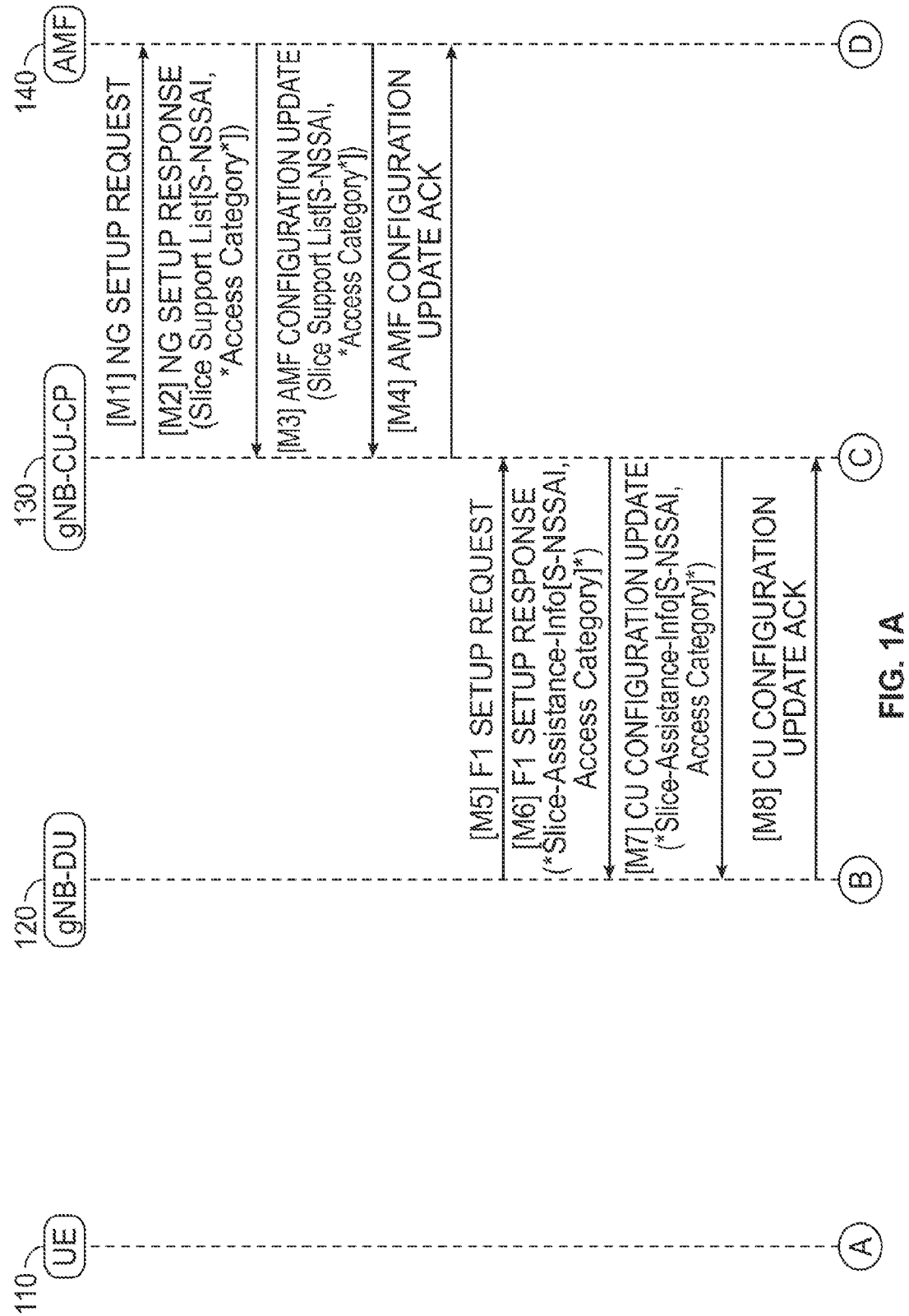
FIG. 1 illustrates the message flows for slice specific overload detection in a radio access network according to an embodiment.

FIG. 1 illustrates message flows among the UE 110, gNB-DU 120, gNB-CU-CP 130 and AMF 140 for slice specific overload detection in a RAN according to an embodiment. In [M1], the gNB-CU-CP 130 sends an NG Setup Request message to the AMF 140, and in [M2], the AMF 140 replies with an AMF Setup Response message. Included in the AMF Setup Response message is a slice support list of S-NSSAIs that identifies a particular RAN network slice, and furthermore, with information that maps slices to operator specific access categories. If the network configuration has been changed, in [M3], the AMF 140 sends an AMF Configuration Update message to the gNB-CU-CP 130. Included in the AMF Configuration Update message is an updated slice support list of S-NSSAIs and access category mapping information, and in [M4], the gNB-CU-CP 130 replies with an AMF Configuration Update Acknowledgement.

In [M5], the gNB-DU 120 sends a F1 Setup Request message to the gNB-CU-CP 130, and in [M6], the gNB-CU-CP 130 replies with a F1 Setup Response message. Included in the F1 Setup Response message is a S-NSSAI that identifies a particular RAN network slice, together with the Access Category mapping information. If the network configuration has been changed, in [M7], the gNB-CU-CP 130 sends an CU Configuration Update message to the gNB-DU 120. Included in the CU Configuration Update message is an updated S-NSSAI Access Category mapping information, and [M8], the gNB-DU 120 replies with an CU Configuration Update Acknowledgement.

When the gNB-DU detects a slice specific overload based on the slice specific PRB resource share configuration and current PRB utilization in the cell. In one embodiment, a slice specific overload condition occurs when the utilization of a slice specific PRB resource exceeds a threshold for a predetermined period of time. In one embodiment, the PRB utilization threshold is compared against a baseline configuration for a slice specific resource in a cell, and the baseline configuration is based on Radio Resource Management (RRM) policy ratios.

When an overload is detected, the gNB-DU automatically determines the barring percentage depending on the percentage of access to restrict in order to mitigate the slice specific congestion. In [M9], the gNB-DU 120 sends the UAC-barring information in the System Information Block 1 (SIB1) to the UE 110, and the UE applies access restriction for specific slices depending on the operator access category barred for access.

Figure 2B:
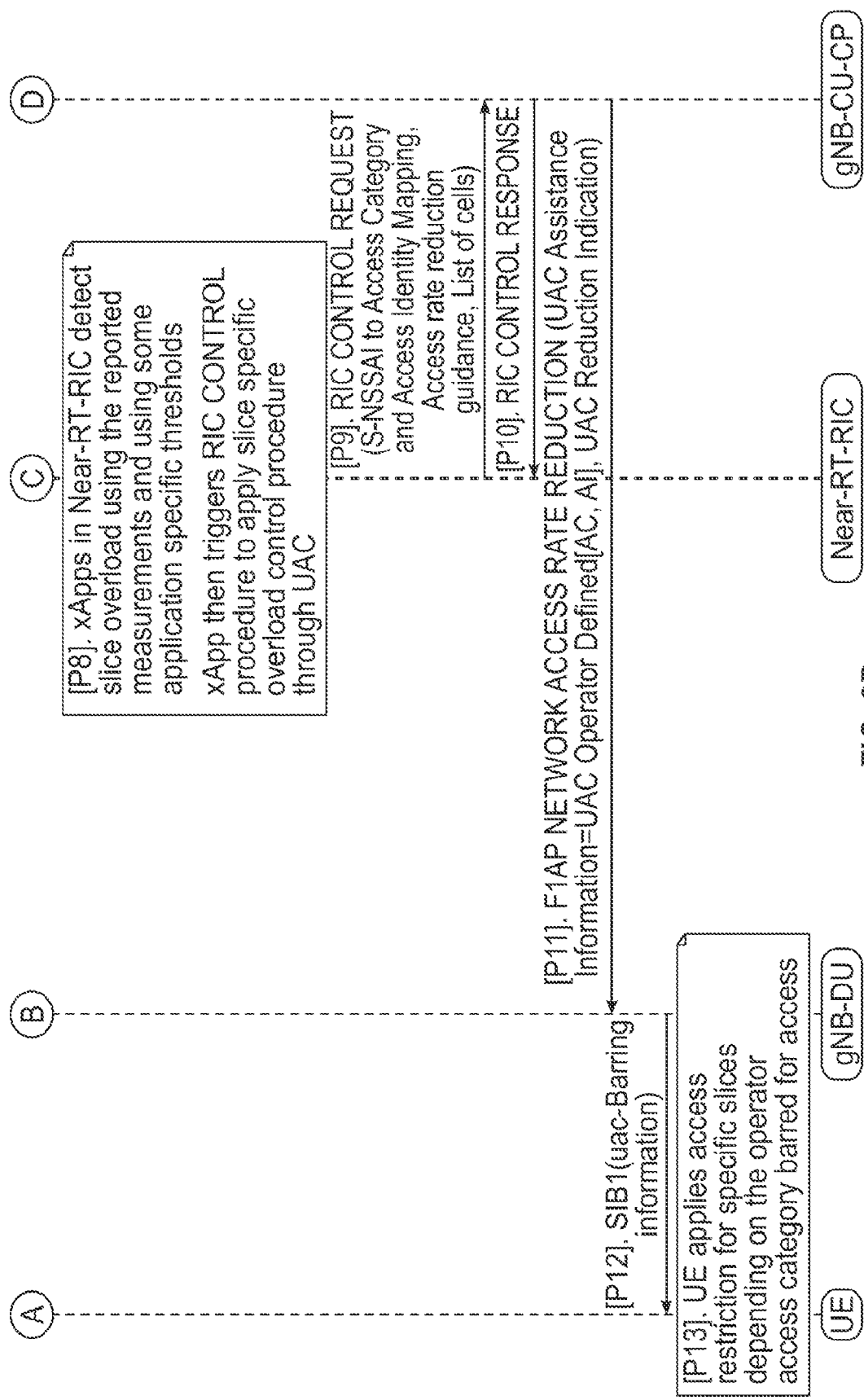
FIG. 2 illustrates the process for slice specific overload detection in a radio access network according to an embodiment.

FIG. 2 illustrates the process flow for slice specific overload detection in a RAN (by a xApp in Near-RT RIC) according to one embodiment. In [P1], the Near-RT RIC 230 obtains the S-NSSAI specific RRM policy configuration in the gNB-DU 220 either through an E2 configuration update procedure or RIC subscription request/RIC indication procedures. In [P2], the Near-RT RIC 230 sends an RIC Subscription Request to gNB-DU 220. The RIC Subscription Request includes a Report action request for a Physical Resource Block (PRB) activity measurement, with the measurement name (e.g., RRU.PrbUsedDl as defined in 3GPP TS 28.552 section 5.1.1.2.5), measurement label (e.g., SNS-SAI) and reporting period. In [P3], the gNB-DU 220 replies with a RIC subscription response. In [P4], the Near-RT RIC 230 sends another RIC Subscription Request to gNB-DU 220. The RIC Subscription Request includes a Report action request for a Data Radio Bearer (DRB) activity measurement with the measurement name (e.g., DRB.MeanActiveUeDl_Filter), measurement label (e.g., SNSSAI) and reporting period. In [P5], the gNB-DU 220 replies with a RIC subscription response. In [P6]: The gNB-DU 220 collects the requested measurement over the reporting period. In [P7], the gNB-DU 220 sends an RIC Indication to the Near-RT RIC 230 with the requested measurement reports (e.g., RUU.PrbUsedDl.SNSSAI) and (e.g., DRB.MeanActiveUeDl_Filter. SNSSAI). In [P8]: When the xApps in the Near-RT RIC 230 detects a slice overload using the reported measurements together with some application specific thresholds, the xApps then triggers an RIC control procedure to apply slice specific overload control procedure through UAC. Similar to the above, a slice specific overload condition occurs when the utilization of a slice specific PRB resource exceeds a threshold for a predetermined period of time. In one embodiment, the PRB utilization threshold is compared against a baseline configuration for a slice specific resource in a cell, and the baseline configuration is based on Radio Resource Management (RRM) policy ratios.

In [P9]: The Near-RT RIC 230 sends an RIC control request to the gNB-CU-CP 240. The RIC control request including at least the following parameters: S-NSSAI to operator specific access category and access identities mapping, list of cells, and a rate reduction percentage. In [P10], the gNB-CU-CP 240 replies with a RIC control response. In [P11]: The gNB-CU-CP 240 send a F1AP Network Access Rate Reduction message indicating UAC reduction with UAC assistance information to the gNB-DU 220. In [P12]: The gNB-DU 220 sends a SIB1 with UAC-barring information to the UE 210. In [P13]: The UE 210 applies access restriction for specific slices depending on the operator access category barred for access.

As described above, in one general aspect, a method of performing slice specific overload control in a wireless communication system is provided. The method includes detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI); mapping slices to access categories in the RAN; and informing the RAN of actions to take to mitigate the detected slice specific overload.

Implementations of the method may include one or more of the following features. In the method, the PRB utilization threshold is exceeded for the predetermined period of time, the PRB utilization threshold is compared against a baseline configuration for a slice specific resource in a cell, and the baseline configuration is according to Radio Resource Management (RRM) policy ratios, according to an embodiment. The method further includes controlling a gNB-Centralized Unit Control Plane (gNB-CU-CP) to trigger a specific action to mitigate the detected slice specific overload, according to an embodiment. Further in the method, the mapping of slices to operator specific access categories is performed by an Access Mobility Function (AMF), and wherein the AMF sends mapping information to the gNB-CU-CP, according to an embodiment. Further in the method, the mapping information is carried via a Next Generation (NG) setup response message or an AMF configuration update message, according to an embodiment. The method further includes sending the mapping information from the gNB-CU-CP to the gNB-DU via an F1 setup response message or a CU configuration update message. In the method, detecting the slice specific overload is performed by an xApp running at a Near-Real-Time RAN Intelligent Controller (Near-RT RIC), the Near-RT RIC receiving real time streaming of cell specific S-NSSAI specific PRB utilization, and wherein the Near-RT RIC receives S-NSSAI specific Radio Resource Management (RRM) policy configuration in a gNB Distributed Unit (gNB-DU) via an E2 configuration update procedure or RIC subscription request/RIC indication procedure, according to an embodiment. The method further includes reporting by Physical Resource Block (PRB) and Data Radio Bearer (DRB) activity the gNB-DU to the Near-RT RIC at a requested reporting period, according to an embodiment. Further in the method, the Near-RT RIC sends an RIC control request to the gNB-CU-CP, the RIC control request including at least the following parameters: S-NSSAI to operator specific access category and access identities mapping, list of cells, and a rate reduction percentage, according to an embodiment. Further in the method, the gNB-CU-CP triggers a network access rate reduction message to the gNB-DU, and wherein the gNB-DU triggers Unified Access Control (UAC) barring to one or more User Equipment (UE), according to an embodiment.

As described above, in another general aspect, a wireless communication system is provided. The wireless communication system includes a core network; a Radio Access Network (RAN), the RAN including: a plurality of User Equipment; and a plurality of base stations (gNB), each of the plurality of gNB including with at least one Centralized Unit (CU) and one Distributed Unit (DU), wherein a gNB-CU Control Plane (gNB-CU-CP) is configured to trigger a specific action to mitigate a detected slice specific overload; an Access Mobility Function (AMF); and a Near-Real-Time RAN Intelligent Controller (Near-RT RIC), wherein at least one gNB-DU or the Near-RT RIC is configured to detect a slice overload in the RAN based on a Physical Resource Block (PRB) utilization threshold and a predetermined period of time, wherein a particular RAN network slice is identified via Network Slice Selection Assistance Information (S-NSSAI), wherein mapping slices to operator specific categories is performed by one of the AMF or Near-RT RIC, the AMF or Near-RT RIC sending the mapping information to the gNB-CU-CP, and wherein the RAN is configured to take the specific action to mitigate the detected slice specific overload.

Implementations of the wireless communication system may include one or more of the following features. In the system, the PRB utilization threshold is exceeded for the predetermined period of time, the PRB utilization threshold is compared against a baseline configuration for a slice specific resource in a cell, and wherein the baseline configuration is according to Radio Resource Management (RRM) policy ratios, according to an embodiment. In order to consider the slice as overloaded, the PRB utilization shall be seen consistently above the threshold for a configured period of time. In a further embodiment, the detecting is performed by the gNB-DU and mapping information is sent by the AMF to the gNB-CU-CP via a Next Generation (NG) setup response message or an AMF configuration update message. In a further embodiment, the gNB-CU-CP is further configured to send the mapping information to the gNB-DU via an F1 setup message or a CU configuration update message. In a further embodiment, detecting the slice specific overload is performed by an xApp running at the Near-RT RIC, the Near-RT RIC receiving real time streaming of cell specific and S-NSSAI specific PRB utilization, and wherein the Near-RT RIC receives S-NSSAI specific RRM policy configuration in the gNB-DU via an E2 configuration update procedure or RIC subscription request/RIC indication procedure. In a further embodiment, the gNB-DU is configured to report Physical Resource Block (PRB) and Data Radio Bearer (DRB) activity to the Near-RT RIC at a requested reporting period. In a further embodiment, the Near-RT RIC sends a RIC control request to the gNB-CU-CP, the RIC control request including at least the following parameters: S-NSSAI to operator specific access category and access identities mapping, list of cells, and a rate reduction percentage. In a further embodiment, the gNB-CU-CP triggers a network access rate reduction message to the gNB-DU, and wherein the gNB-DU triggers Universal Access Code (UAC) barring to one or more User Equipment (UE).

As described above, in another general aspect, a non-transitory computer-readable medium having stored thereon instructions for causing processing circuitry to execute a process is provided. The process includes detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI); mapping slices to access categories in the RAN; and informing the RAN of actions to take to mitigate the detected slice specific overload.

Other variations to the disclosed embodiments can be understood and effected by those skilled in the art in practicing the claimed features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, displaying, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of performing slice specific overload control in a wireless communication system, the method comprising:
   detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI);
   mapping slices to operator specific access categories in the RAN; and informing the RAN of actions to take to mitigate the detected slice specific overload.

2. The method according to claim 1, wherein the PRB utilization threshold is exceeded for the predetermined period of time, wherein the PRB utilization threshold is compared against a baseline configuration for a slice specific resource in a cell, and wherein the baseline configuration is according to Radio Resource Management (RRM) policy ratios.

3. The method according to claim 2, further comprising controlling a gNB-Centralized Unit Control Plane (gNB-CU-CP) to trigger a specific action to mitigate the detected slice specific overload.

4. The method according to claim 3, further comprising detecting the slice specific overload at a gNB Distributed Unit (gNB-DU).

5. The method according to claim 4, wherein the mapping of slices to operator specific access categories is performed by an Access Mobility Function (AMF), and wherein the AMF sends mapping information to the gNB-CU-CP.

6. The method according to claim 5, wherein the mapping information is carried via a Next Generation (NG) setup response message or an AMF configuration update message.

7. The method according to claim 6, further comprising sending the mapping information from the gNB-CU-CP to the gNB-DU via an F1 setup response message or a CU configuration update message.

8. The method according to claim 3, wherein detecting the slice specific overload is performed by an xApp running at a Near-Real-Time RAN Intelligent Controller (Near-RT RIC), the Near-RT RIC receiving real time streaming of cell specific S-NSSAI specific PRB utilization, and wherein the Near-RT RIC receives S-NSSAI specific Radio Resource Management (RRM) policy configuration in a gNB Distributed Unit (gNB-DU) via an E2 configuration update procedure or RIC subscription request/RIC indication procedure.

9. The method according to claim 8, further comprising reporting by Physical Resource Block (PRB) and Data Radio Bearer (DRB) activity the gNB-DU to the Near-RT RIC at a requested reporting period.

10. The method according to claim 9, wherein the Near-RT RIC sends an RIC control request to the gNB-CU-CP, the RIC control request including at least the following parameters: S-NSSAI to operator specific access category and access identities mapping, list of cells, and a rate reduction percentage.

11. The method according to claim 10, wherein the gNB-CU-CP triggers a network access rate reduction message to the gNB-DU, and wherein the gNB-DU triggers Unified Access Control (UAC) barring to one or more User Equipment (UE).

12. A wireless communication system comprising;
a core network;
a Radio Access Network (RAN), the RAN comprising:
 a plurality of User Equipment; and
 a plurality of base stations (gNB), each of the plurality of gNB including with at least one Centralized Unit (CU) and one Distributed Unit (DU), wherein a gNB-CU Control Plane (gNB-CU-CP) is configured to trigger a specific action to mitigate a detected slice specific overload;
an Access Mobility Function (AMF); and
a Near-Real-Time RAN Intelligent Controller (Near-RT RIC), wherein at least one gNB-DU or the Near-RT RIC is configured to detect a slice overload in the RAN based on a Physical Resource Block (PRB) utilization threshold and a predetermined period of time, wherein a particular RAN network slice is identified via Network Slice Selection Assistance Information (S-NSSAI), wherein mapping slices to operator specific categories is performed by one of the AMF or Near-RT RIC, the AMF or Near-RT RIC sending the mapping information to the gNB-CU-CP, and wherein the RAN is configured to take the specific action to mitigate the detected slice specific overload.

13. The wireless communication system of claim 12, wherein the PRB utilization threshold is exceeded for the predetermined period of time, wherein the PRB utilization threshold is compared against a baseline configuration for a slice specific resource in a cell, and wherein the baseline configuration is according to Radio Resource Management (RRM) policy ratios.

14. The wireless communication system of claim 13, wherein the detecting is performed by the gNB-DU and mapping information is sent by the AMF to the gNB-CU-CP via a Next Generation (NG) setup response message or an AMF configuration update message.

15. The wireless communication system of claim 14, wherein the gNB-CU-CP is further configured to send the mapping information to the gNB-DU via an F1 setup message or a CU configuration update message.

16. The wireless communication system of claim 13, wherein detecting the slice specific overload is performed by an xApp running at the Near-RT RIC, the Near-Rt RIC receiving real time streaming of cell specific and S-NSSAI specific PRB utilization, and wherein the Near-RT RIC receives S-NSSAI specific RRM policy configuration in the gNB-DU via an E2 configuration update procedure or RIC subscription request/RIC indication procedure.

17. The wireless communication system according to claim 16, wherein the gNB-DU is configured to report Physical Resource Block (PRB) and Data Radio Bearer (DRB) activity to the Near-RT RIC at a requested reporting period.

18. The wireless communication system according to claim 17, wherein the Near-RT RIC sends a RIC control request to the gNB-CU-CP, the RIC control request including at least the following parameters: S-NSSAI to operator specific access category and access identities mapping, list of cells, and a rate reduction percentage.

19. The wireless communication system according to claim 18, wherein the gNB-CU-CP triggers a network access rate reduction message to the gNB-DU, and wherein the gNB-DU triggers Universal Access Code (UAC) barring to one or more User Equipment (UE).

20. A non-transitory computer-readable medium having stored thereon instructions for causing processing circuitry to execute a process, the process comprising:
 detecting a slice specific overload in a Radio Area Network (RAN) based on a Physical Resource Block (PRB) utilization threshold and a predetermined period of time, wherein a particular RAN network slice is identified via Network Slice Selection Assistance Information (S-NSSAI);
 mapping slices to operator specific access categories in the RAN; and
 informing the RAN of actions to take to mitigate the detected slice specific overload.

* * * * *